C. A. CALDWELL.
STEERING ROD FOR AUTOMOBILES.
APPLICATION FILED SEPT. 2, 1919.
1,343,305.   Patented June 15, 1920.
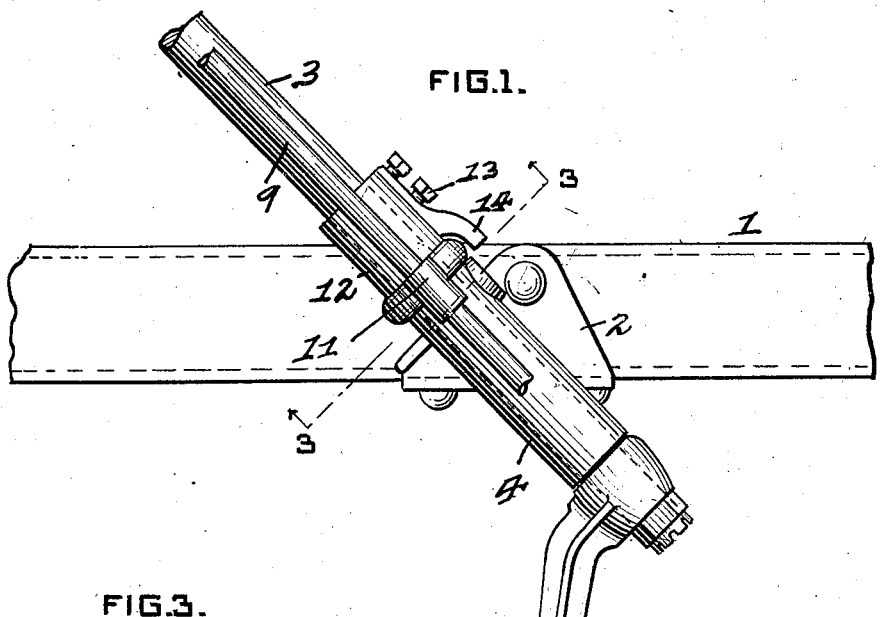
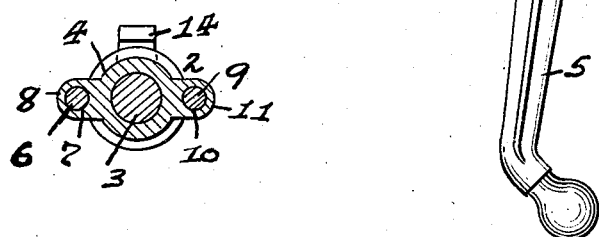
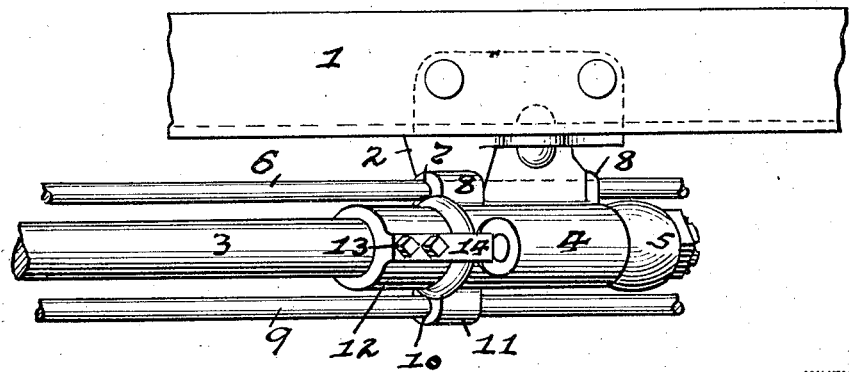
WITNESS
J. Herbert Bradley.
INVENTOR
Clifford A. Caldwell.
By J. N. Cooke,
Attorney.

UNITED STATES PATENT OFFICE.

CLIFFORD A. CALDWELL, OF PITTSBURGH, PENNSYLVANIA.

STEERING-ROD FOR AUTOMOBILES.

1,343,305. Specification of Letters Patent. Patented June 15, 1920.

Application filed September 2, 1919. Serial No. 320,995.

*To all whom it may concern:*

Be it know that I, CLIFFORD A. CALDWELL, a citizen of the United States, and a resident of Pittsburgh, in the county of Allegheny and State of Pennsylvania, have invented a new and useful Improvement in Steering-Rods for Automobiles; and I do hereby declare the following to be a full, clear, and exact description thereof.

My invention relates to steering rods for automobiles, and has special reference to such rods as used on Ford cars.

The object of my invention is to provide a cheap, simple and efficient device for use in connection with such steering rods, which will limit the movement of such rods, and thereby overcoming the liability of the connecting arm on the end of the same passing over the dead center.

To these ends, my invention consists, generally stated, in the novel arrangement, construction and combination of parts as hereinafter more specifically set forth and described, and particularly pointed out in the claims.

To enable others skilled in the art to which my invention appertains to construct and use my improved device for automobile steering rods, I will describe the same more fully, referring to the accompanying sheet of drawings, in which:—

Figure 1 is a side elevation showing a portion of a Ford steering rod and having my invention applied thereto;

Fig. 2 is a top view of the same; and

Fig. 3 is a cross section of the rod, taken on the line 3—3 of Fig. 1 and looking in the direction of the arrows.

Like symbols of reference herein indicate like parts in each of the figures of the drawings.

As illustrated in the drawings, 1 represents the usual frame of an automobile, such as a Ford car, and secured to such frame is a supporting bracket 2 which carries the lower end of the steering rod 3 by means of a collar of sleeve 4 formed on said bracket, through which said rod passes, and such rod has the arm 5 secured to the lower end of the same for connection with the usual operating part for the wheels (not shown).

The usual gas operating rod 6 passes through a hole 7 in the bracket 2 and in a projection 8 on the upper and lower end of the same, and the usual spark operating rod 9 passes along the face of the sleeve 4 and through a hole 10 in a projection 11 of the upper end of such sleeve.

Mounted upon the steering rod 3 and adjacent the upper end of the bracket 2 and sleeve 4 is the collar 12, which is secured to said rod by means of the set screws 13 passing through said collar and engaging with said rod, and such collar is provided with a tongue 14 formed integral therewith. This tongue is adapted to extend over the upper end of the bracket 2 and between the projections 8 and 11 on said end.

The use and operation of my improved device for steering rods is as follows: The operator in steering the automobile will turn the wheel (not shown) at the upper end of the steering rod 2 which will turn or rotate such rod in the usual manner, as well as the arm 5, and the tongue 14 on the collar 12 will thus come in contact with the projection 8 or 11 on the bracket 2 according to which direction the car is steered, and thus limit the movement of said rod and arm.

It will thus be seen that in the use of my improved steering rod the liability of the automobile running along when the arm on such rod should happen to pass its dead center is overcome and thereby preventing the possible accident or collision therefrom and the damage or injury in consequence thereof.

It will be evident that the device can be applied to automobiles other than of the Ford make, and that various modifications and changes in the design and construction of the same may be resorted to without departing from the spirit of the invention or sacrificing any of its advantages.

What I claim as my invention and desire to secure by Letters Patent is:

1. The combination with the steering rod and frame of an automobile, of means for attaching said rod to the frame, and a collar secured to said rod and engaging with said means to limit the movement of said rod.

2. The combination with the steering rod of an automobile, of a bracket for supporting said rod, and a collar secured to said rod and engaging with said bracket to limit the movement of said rod.

3. The combination with the steering rod of an automobile, of a bracket for supporting said rod, projections on said bracket, a collar secured to said rod, and a tongue on said collar for engaging with said projections to limit the movement of said rod.

In testimony whereof I, the said CLIFFORD A. CALDWELL, have hereunto set my hand.

CLIFFORD A. CALDWELL.

Witnesses:
J. N. COOKE,
E. B. MOLTER.